US010496628B2

(12) United States Patent
Owuor et al.

(10) Patent No.: US 10,496,628 B2
(45) Date of Patent: Dec. 3, 2019

(54) APPLICATION OF RETENTION RULES TO RECORDS

(71) Applicant: Oracle International Corporation, Redwood Shores, CA (US)

(72) Inventors: Victor Orwa Owuor, Eden Prairie, MN (US); Tok Hui Mackenthun, Prior Lake, MN (US); Scott Andrew Nelson, Eagan, MN (US)

(73) Assignee: Oracle International Corporation, Redwood Shores, CA (US)

( * ) Notice: Subject to any disclaimer, the term of this patent is extended or adjusted under 35 U.S.C. 154(b) by 145 days.

(21) Appl. No.: 13/771,692

(22) Filed: Feb. 20, 2013

(65) Prior Publication Data

US 2014/0236910 A1    Aug. 21, 2014

(51) Int. Cl.
*G06F 16/23*    (2019.01)

(52) U.S. Cl.
CPC .................... *G06F 16/23* (2019.01)

(58) Field of Classification Search
CPC .............. G06F 17/30011; G06F 17/30; G06F 17/30899; G06F 17/30085; G06F 9/44505; G06F 17/30722; G06F 16/23
USPC ........................................................ 707/694
See application file for complete search history.

(56) References Cited

U.S. PATENT DOCUMENTS

| 7,739,746 | B2 | 6/2010 | Donahue |
| 7,801,920 | B2* | 9/2010 | Todd et al. ................... 707/796 |
| 7,856,436 | B2 | 12/2010 | DeBie |
| 8,527,468 | B1* | 9/2013 | Crafford ........... G06F 17/30011 707/662 |
| 8,856,081 | B1* | 10/2014 | Chaudhari ........ G06F 17/30085 707/661 |
| 9,201,877 | B1* | 12/2015 | Humby .................... G06F 17/30 |
| 2005/0055519 | A1* | 3/2005 | Stuart et al. .................. 711/159 |
| 2005/0076042 | A1* | 4/2005 | Stakutis ............ G06F 17/30085 |
| 2006/0259468 | A1 | 11/2006 | Brooks et al. |
| 2007/0088585 | A1 | 4/2007 | Maguire |
| 2007/0088715 | A1 | 4/2007 | Slackman et al. |

(Continued)

FOREIGN PATENT DOCUMENTS

JP    2007072805 A    3/2007

OTHER PUBLICATIONS

"Oracle Fusion Middleware: Setup Guide for Universal Records Management 11g Release 1 (11.1.1)". Oct. 2010. Oracle. pp. 1-370.*

(Continued)

*Primary Examiner* — Michael Pham
(74) *Attorney, Agent, or Firm* — Potomac Law Group, PLLC

(57) ABSTRACT

A system for automatically applying retention categories and retention rules to records. The system defines a plurality of retention categories. Each retention category of the plurality of retention categories comprises a criteria for membership in the retention category and at least one retention rule for the retention category. The system receives at least one record. The system automatically associates a retention category of the plurality of retention categories with the at least one record. The at least one record meets the criteria for membership in the associated retention category. The system automatically applies the retention rule of the associated retention category to the at least one record.

15 Claims, 17 Drawing Sheets

(56) References Cited

U.S. PATENT DOCUMENTS

| | | | | |
|---|---|---|---|---|
| 2007/0150521 | A1* | 6/2007 | Vedula | 707/200 |
| 2007/0271308 | A1* | 11/2007 | Bentley | G06F 16/93 |
| 2008/0154969 | A1* | 6/2008 | DeBie | G06F 17/30085 |
| 2009/0119354 | A1* | 5/2009 | Stuart | G06F 17/30082 |
| 2011/0153578 | A1* | 6/2011 | Pogodin | G06F 16/258 707/694 |
| 2011/0153579 | A1* | 6/2011 | Paknad | G06F 16/258 707/694 |
| 2013/0332429 | A1* | 12/2013 | Arasachetty | G06Q 10/10 707/694 |
| 2014/0059023 | A1* | 2/2014 | Freeman et al. | 707/694 |

OTHER PUBLICATIONS

"Oracle WebCenter Content: Setup Guide for Records 11g Release 1 (11.1.1)". Nov. 2011. Oracle. pp. 1-358.*

Information Management Specialists, Records Management Consultants, http://www.recordsconsultants.com/imspages/ourservices.html#retentionrules, Feb. 19, 2013.

Assistant Secretary of Defense for Networks and Information Integration/Department of Defense Chief Information Officer, "Electronic Records Management Software Applications Design Criteria Standard", DoD 5015.02-STD, http://jitc.fhu.disa.mil/cgi/rma/standards.aspx, Apr. 25, 2007.

* cited by examiner (Prior Art)
Fig. 4

US 10,496,628 B2

APPLICATION OF RETENTION RULES TO RECORDS

FIELD

One embodiment is directed generally to a computer system, and in particular to a computer system for record retention.

BACKGROUND INFORMATION

A "record" may be considered as anything that can be preserved or represented in order to serve as evidence for some purpose. An organization may use records to describe various events and dealings of the organization. If the organization uses a large number of records, the organization may wish to manage each record from the time the record is created until the time the record is discarded. The management of the records may include specific policies for organizing, keeping, safeguarding, and disposing of the records.

In the management of records, the organization may determine a retention period for each record. The retention period for a record may define the duration of time that the record is kept before being disposed of. The determined retention period may differ across different records, depending upon the types of records considered.

SUMMARY

One embodiment is a system for automatically applying retention categories and retention rules to records. The system defines a plurality of retention categories. Each retention category of the plurality of retention categories comprises a criteria for membership in the retention category and at least one retention rule for the retention category. The system receives at least one record. The system automatically associates a retention category of the plurality of retention categories with the at least one record. The at least one record meets the criteria for membership in the associated retention category. The system automatically applies the retention rule of the associated retention category to the at least one record.

BRIEF DESCRIPTION OF THE DRAWINGS

FIG. 4 is a screen shot of an interface for applying a retention rule to a record in accordance with the prior art.

FIG. 13(*b*) is a flow diagram of performing a revisions process in accordance with one embodiment.

FIG. 13(*c*) is a flow diagram of performing an aging process in accordance with one embodiment.

FIG. 13(*d*) is a flow diagram of performing a checksum process in accordance with one embodiment.

DETAILED DESCRIPTION

Figure 1:
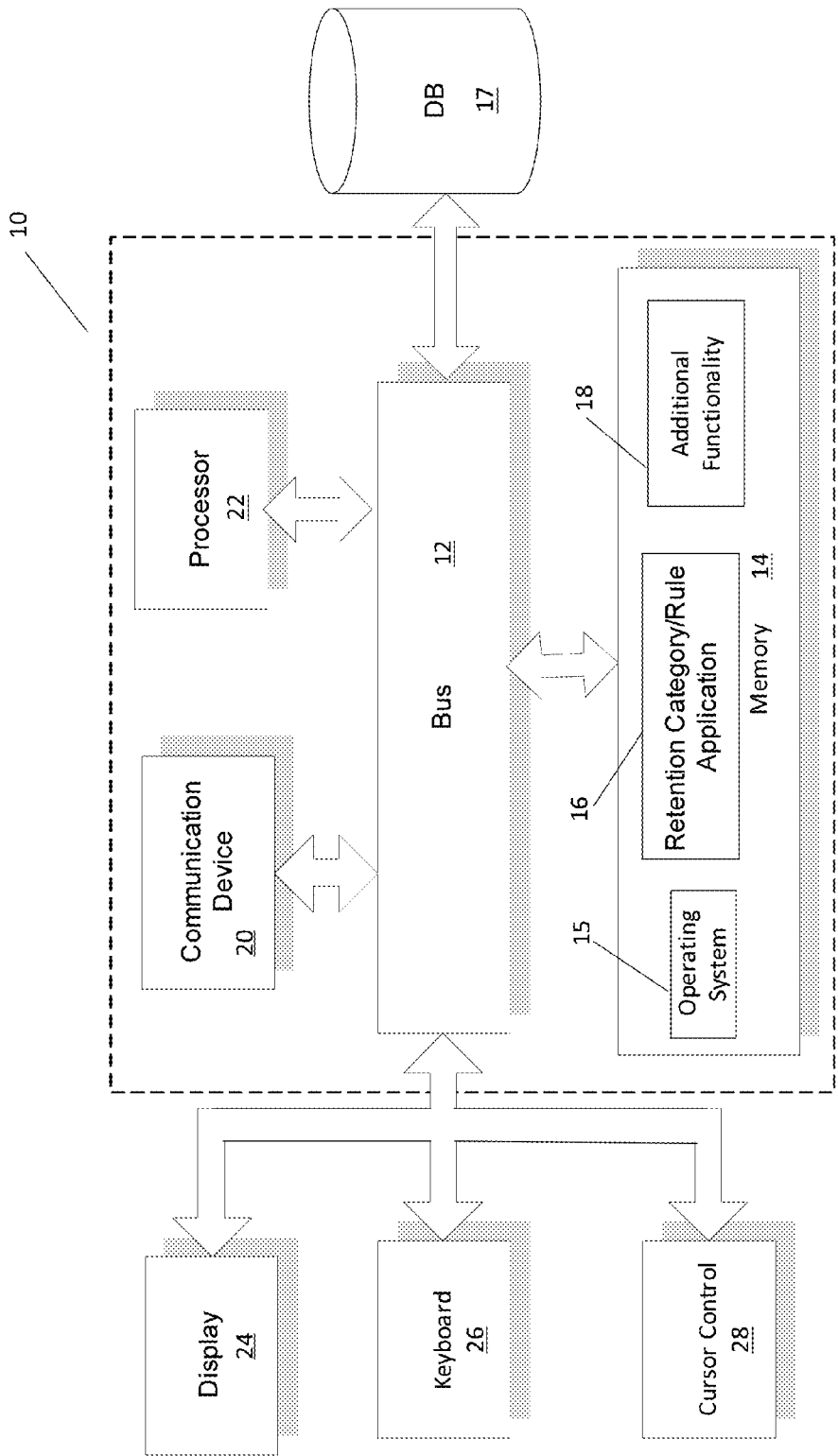
FIG. 1 is an overview block diagram of a computer system for automatically applying retention categories and retention rules to records in accordance with an embodiment of the present invention.

One embodiment is a system for automatically applying retention categories and retention rules to records. In order to apply retention categories and retention rules to records, a plurality of retention categories are defined. Each retention category of the plurality of retention categories comprises a criteria for membership in the retention category and at least one retention rule for the retention category. The system receives at least one record. If the at least one record meets the criteria for membership of a retention category, the record is automatically associated with that retention category. The retention rule of the associated retention category is then automatically applied to the record.

In one embodiment, a retention category (and/or the corresponding retention rule of the retention category) associated with a record may determine how long the record has to be retained (i.e., a retention period), whether or not the record can be edited during the retention period, and the approval process to be followed to destroy the record. The retention category associated with a specific record may also indicate the importance of the specific record and whether the specific record should be reviewed periodically to ensure the integrity of the information contained by the specific record. As such, by associating retention categories with records, certain embodiments may tag important records to ensure the integrity of the information contained by the records and to retain the information for a needed time.

Certain embodiments may associate retention categories with records based upon particular rules and/or business metadata associated with each of the records. The business metadata may be data that has already been associated with the records in order to serve other business needs, business needs unrelated to the retention or the review of the records. In one embodiment, the business metadata of a record may indicate a type of document that the record corresponds to (e.g., an invoice, a contract, a receipt, correspondence, etc.). In another embodiment, the importance of a record may be derived from the associated metadata. As such, certain embodiments may use business data (e.g., business metadata) that is outside and separate from the information contained within a record itself. The business metadata may be added to a record when the user defines the record, as described in more detail below.

Typically, using the known methods, a user (e.g., a member of an organization who creates records) is responsible for associating a retention category with a created record. In one known method for associating retention categories and retention rules with records, a user may use a software product to specifically associate an appropriate retention category/retention rule with each managed record. After the user associates a retention category with a record, a retention identifier may then be stored with the record itself to indicate the record's associated retention category. Although these software products may aid the user in the task of associating retention categories with records, the user generally still needs to understand the details of each of the various retention categories in order for the user to associate an appropriate retention category with a given record. Because associating appropriate retention categories with records is often not a part of the core responsibility/skill-set of the user, the user will often associate incorrect retention categories with records, if the user performs any associating at all.

Additionally, if the retention identifier of a record, which identifies the retention category associated with the record, is stored with the record itself, then any future changes to retention policies, that specify the criteria for how retention categories and retention rules are associated with records, will necessarily require that the stored retention identifiers be changed/updated in order to reflect proper associations between retention categories and records, as defined by the changed retention policy. Such changes/updates to retention identifiers may be costly to perform in terms of time and effort when there are a large number of records.

In contrast with the known methods, certain embodiments of the invention may allow a user to avoid costly changes/updates to retention identifiers. Because certain embodiments enable the association of retention categories and retention rules with records without requiring a user to have experience with associating retention categories/retention rules, the association of retention categories and retention rules may be performed more reliably, more easily, and at less cost. As compared to the known methods, users may be more receptive to certain embodiments because these embodiments may provide a simpler user experience by removing the mechanics of retention and review from the user experience.

FIG. 1 is an overview block diagram of a computer system 10 for automatically applying retention categories and retention rules to records in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include retention category/rule application module 16 for a system that automatically applies retention categories and retention rules to records and thus may control how the records are to be retained, as disclosed in more detail below. System 10 can be part of a larger system. Therefore, system 10 will typically include one or more additional functional modules 18 to include additional functionality, such as data processing functionality for generating data that is used to associate retention categories with records, or for operating in conjunction with a record retention application such as "Webcenter Content" from Oracle Corp. A database 17 is coupled to bus 12 to store data used with modules 16 and 18.

Figure 2:
FIG. 2 is a screen shot of an interface showing different sets of retention rules in accordance with the prior art.

FIG. 2 is a screen shot of an interface 200 showing different sets of retention rules 201, 202, and 203 in accordance with the prior art. Using the known approaches, if a user wanted to determine how to retain a specific record, the user would generally need to browse through different sets of retention rules to find the applicable retention rule to associate with the specific record. For example, to find an applicable retention rule via interface 200, a user may need to browse through different sets of retention rules such as, "Code of Federal Regulations" 201, "Common Law Requirements" 202, and "Company Policy" 203. Browsing through these different sets of retention rules is often tedious to users, and the users may be confused by the different sets of retention rules. As such, as previously described, users may misidentify how to retain a specific record using the known approach of browsing through different sets of retention rules.

Figure 3:
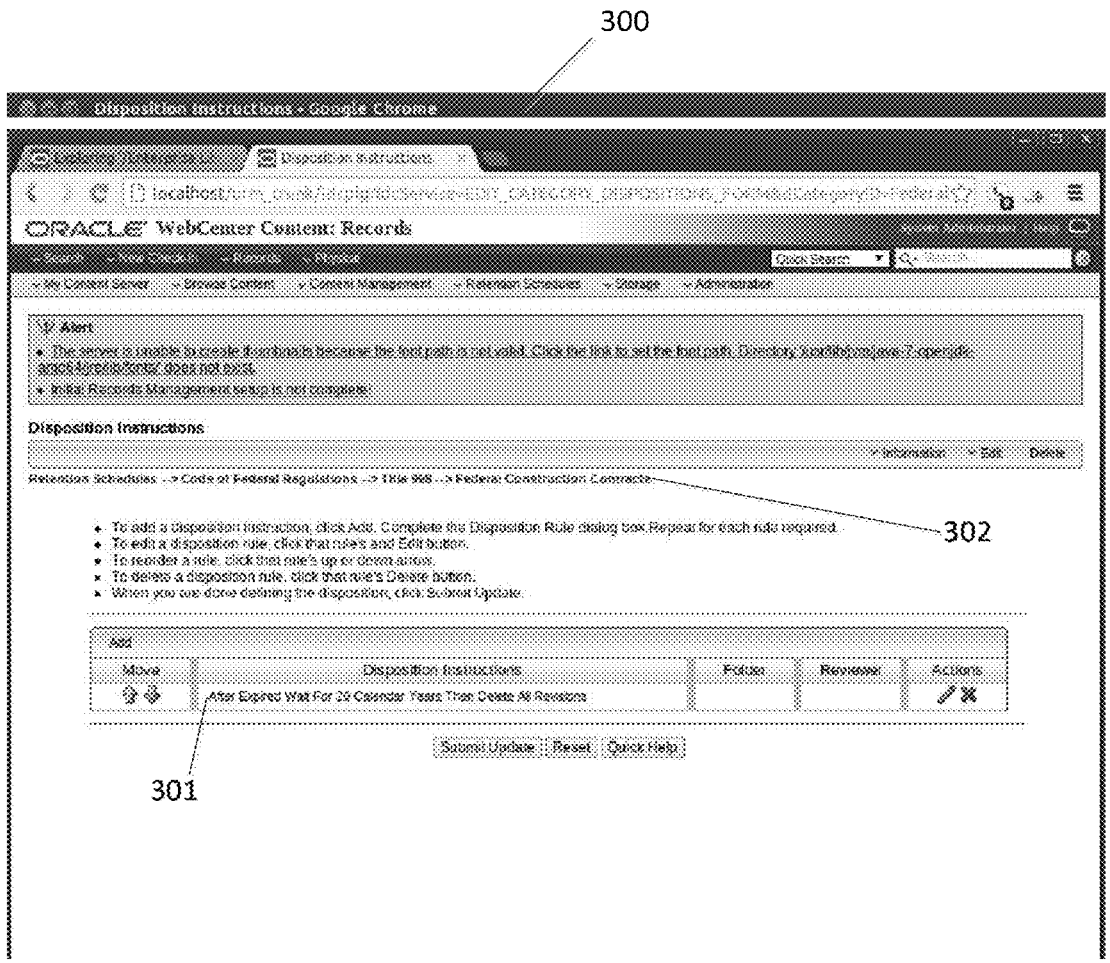
FIG. 3 is a screen shot of an interface showing a specific retention rule in accordance with the prior art.

FIG. 3 is a screen shot of an interface 300 showing a specific retention rule 301 in accordance with the prior art. Upon accessing "Code of Federal Regulations" 201 of FIG. 2, as described above, a user may then view the specifics of retaining "Federal Construction Contracts" 302 within the "Code of Federal Regulations" 201. For instance, as shown in interface 300, the specifics of retaining "Federal Construction Contracts" 302 include instructions such as "After Expired Wait for 20 Calendar Years Then Delete All Revisions" 301. However, as described above, browsing through different sets of retention rules according to the known approaches is generally tedious to users.

Figure 4:
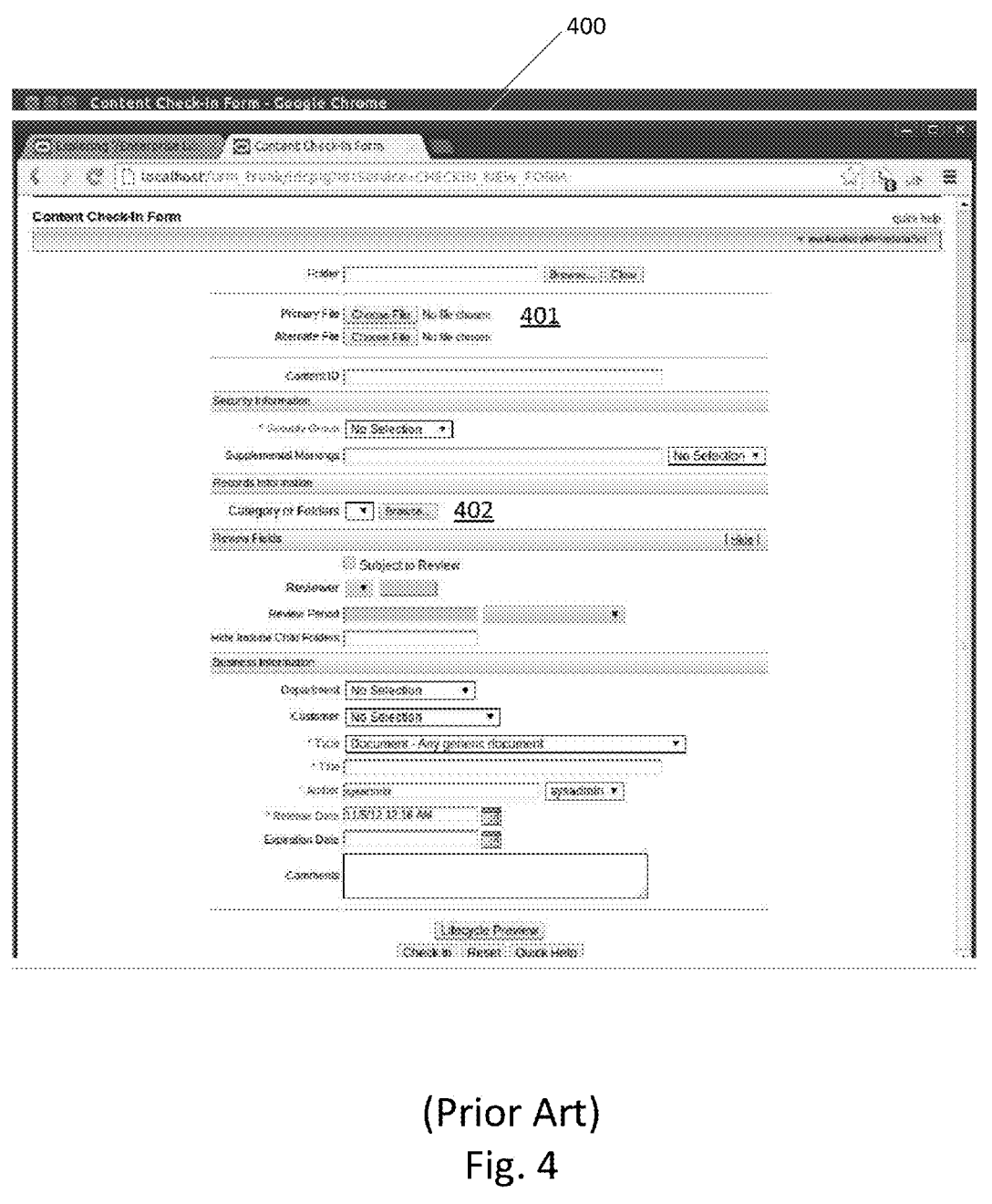

FIG. 4 is a screen shot of an interface 400 for associating a retention rule with a record in accordance with the prior art. Using the known approaches, a user may choose a record to retain using buttons 401. Using the known approaches, after selecting a record to retain using button 401, in general, the user would then manually select a specific retention rule to apply to the selected record. The user would manually select the specific retention rule to apply via button 402. However, as previously described, because the known approaches generally required the user to manually select the specific retention rule to apply to the selected record, the user will often associate incorrect retention rules/categories with records, if the user performs any associating at all.

Figure 5:
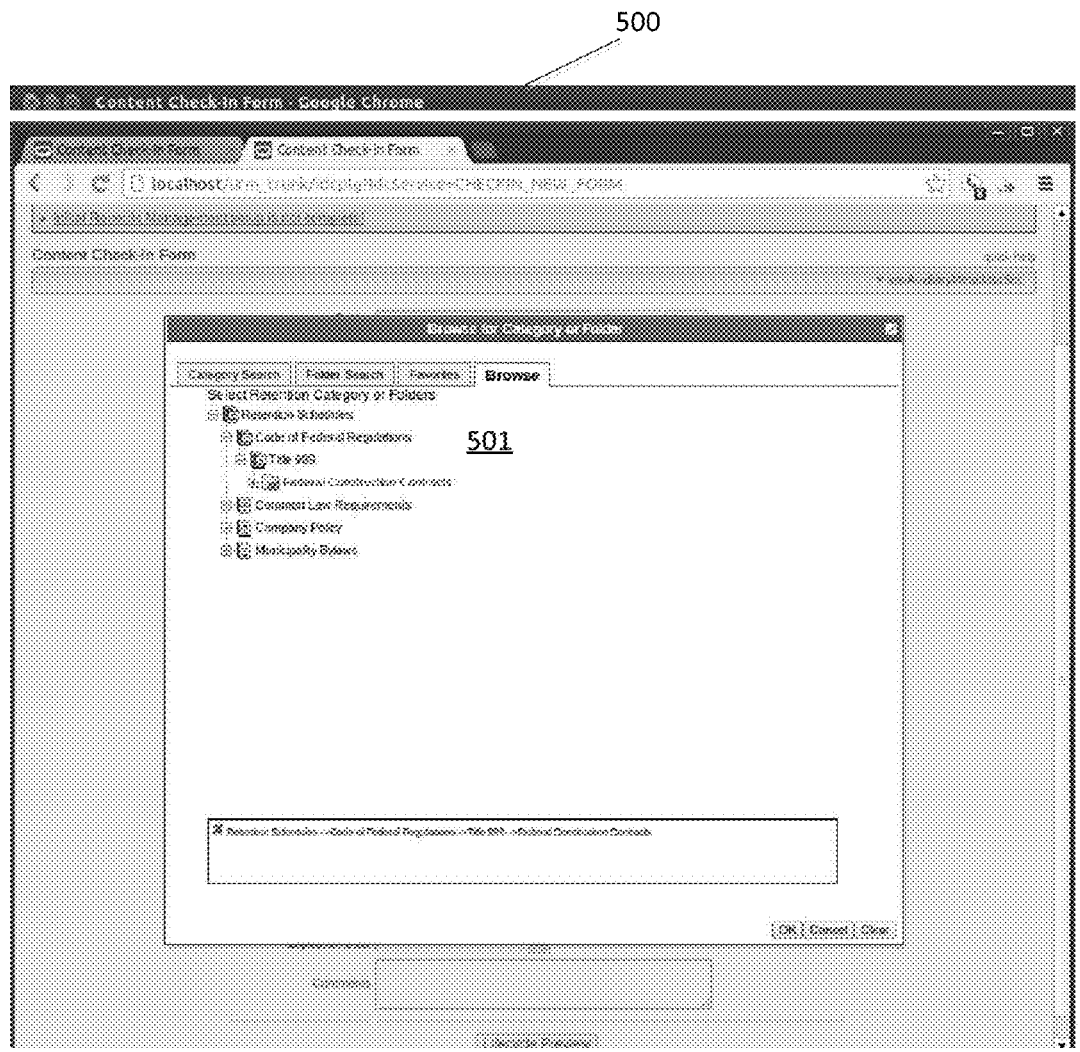
FIG. 5 is a screen shot of an interface for selecting a retention rule in accordance with the prior art.

FIG. 5 is a screen shot of an interface 500 for selecting a retention rule in accordance with the prior art. Using the known approaches, upon clicking button 402 of interface 400 to manually select a specific retention rule, the user may then specifically select the desired retention rule using interface 500. Interface 500 shows a list of retention rules 501 to select from.

Figure 6:
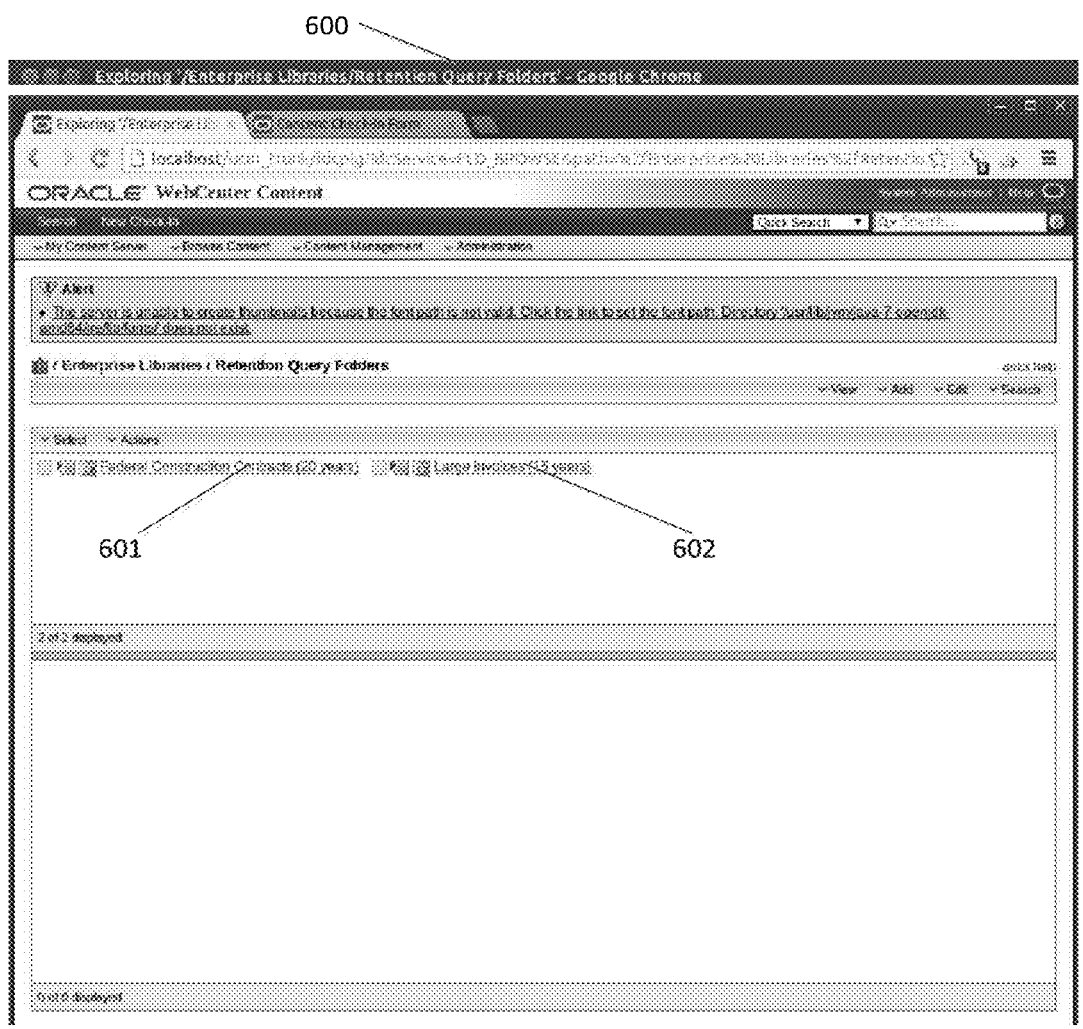
FIG. 6 is a screen shot of an interface showing retention categories in accordance with an embodiment of the present invention.

In contrast to the known approaches, FIG. 6 is a screen shot of an interface 600 showing retention categories in accordance with an embodiment of the present invention. In one embodiment, each of retention categories "Federal Construction Contracts" and "Large Invoices" may be implemented, and referred to, as retention query folders 601 and 602, respectively. Each retention query folder may include a criteria for membership as well as a retention rule, as described in more detail below.

Figure 7:
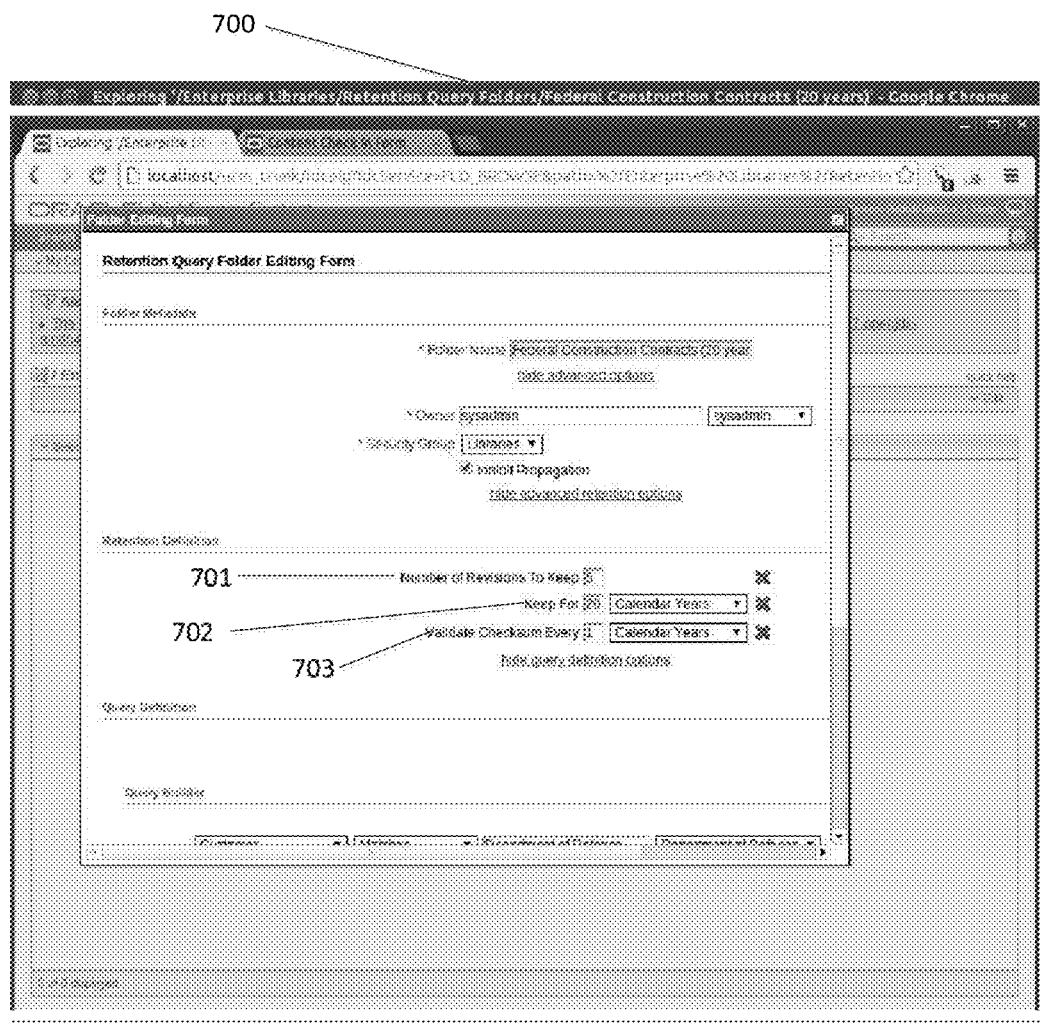
FIG. 7 is a screen shot of an interface for editing retention rules of a retention query folder in accordance with an embodiment of the present invention.

FIG. 7 is a screen shot of an interface 700 for editing retention rules of a retention query folder (corresponding to a retention category) in accordance with an embodiment of the present invention. In one embodiment, a user may change different retention rules of a retention query folder. For example, a user may use interface 700 to edit retention rules of a retention query folder "Federal Construction Contracts" 601 of interface 600. These different properties may then be applied to different records associated with the retention query folder. For example, as shown in FIG. 7, retention rule 701 indicates that "5" revisions are to be kept. Retention rule 702 indicates that the revisions are to be kept for "20" calendar years. Retention rule 703 indicates that a checksum is to be validated every "1" calendar year. Once a record is associated with the retention query folder in accordance with a criteria of the retention query folder, the record has five revisions kept in accordance with retention rule 701, is kept for 20 calendar years in accordance with retention rule 702, and has a checksum validated every 1 calendar year in accordance with retention rule 703.

Figure 8:
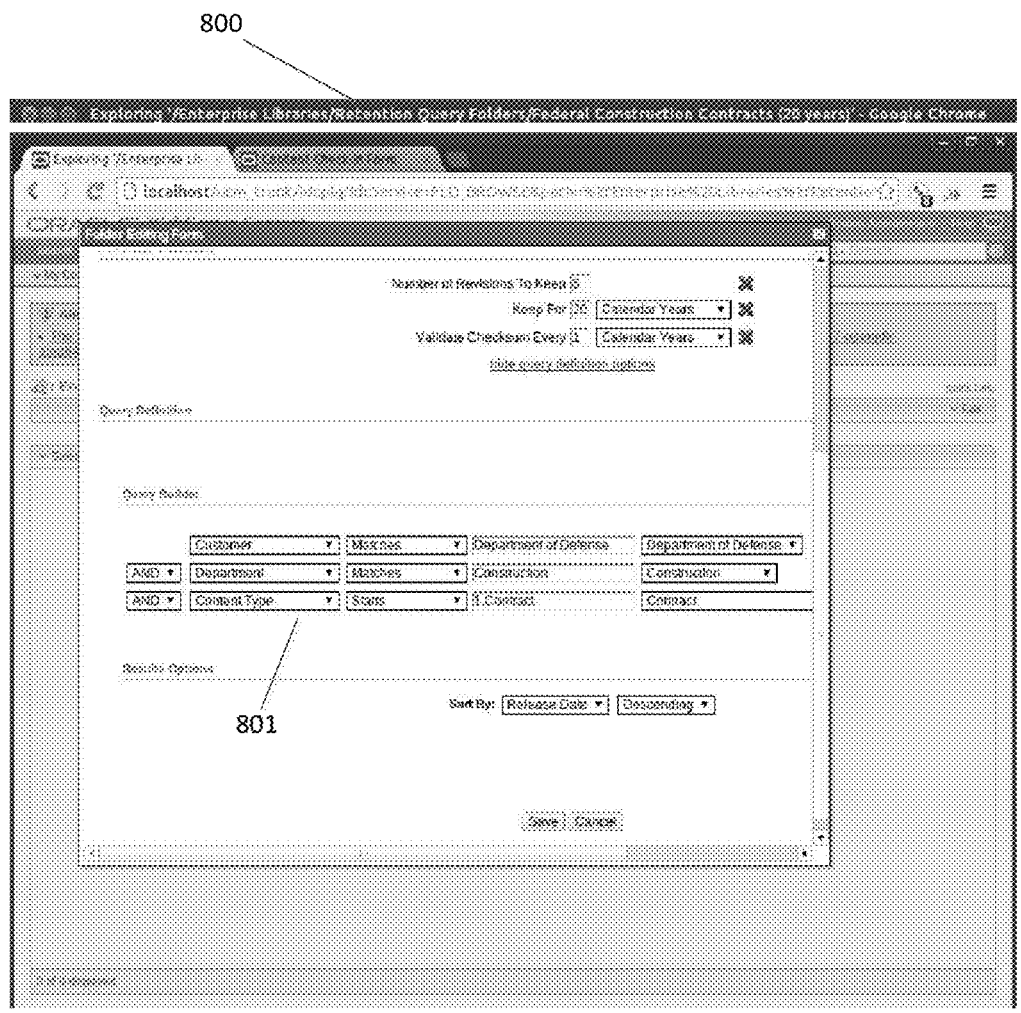
FIG. 8 is a screen shot of an interface for defining a criteria for a retention query folder in accordance with one embodiment.

FIG. 8 is a screen shot of an interface 800 for defining a criteria 801 for a retention query folder (corresponding to a retention category) in accordance with one embodiment. As described above, a criteria may be defined for each retention query folder. For example, the retention query folder of interface 800 may have a defined criteria 801. For example, criteria "Customer Matches Department of Defense AND Department Matches Construction AND Content Type Starts Contract" 801 defines how a record can be associated (have membership) with the retention query folder. Specifically, if a record meets criteria 801, the record is associated with the retention query folder of interface 800.

Figure 9:
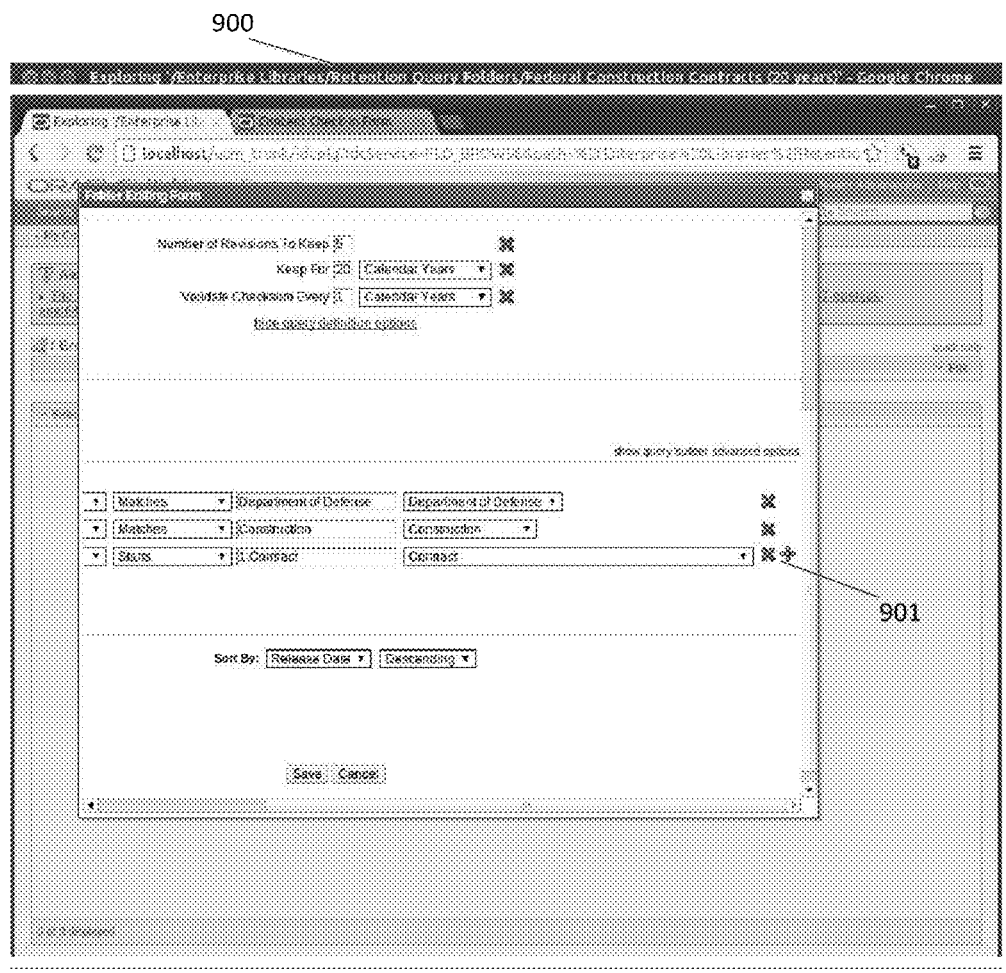
FIG. 9 is a screen shot of an interface for modifying a criteria for a retention query folder in accordance with one embodiment.

FIG. 9 is a screen shot of an interface 900 for modifying a criteria 901 for a retention query folder in accordance with one embodiment. In one embodiment, a user may edit the criteria associated with the retention query folder. For example, using "x" and "+" signs 901 of interface 900, a user may remove from or add to the criteria associated with a retention query folder as needed.

Figure 10:
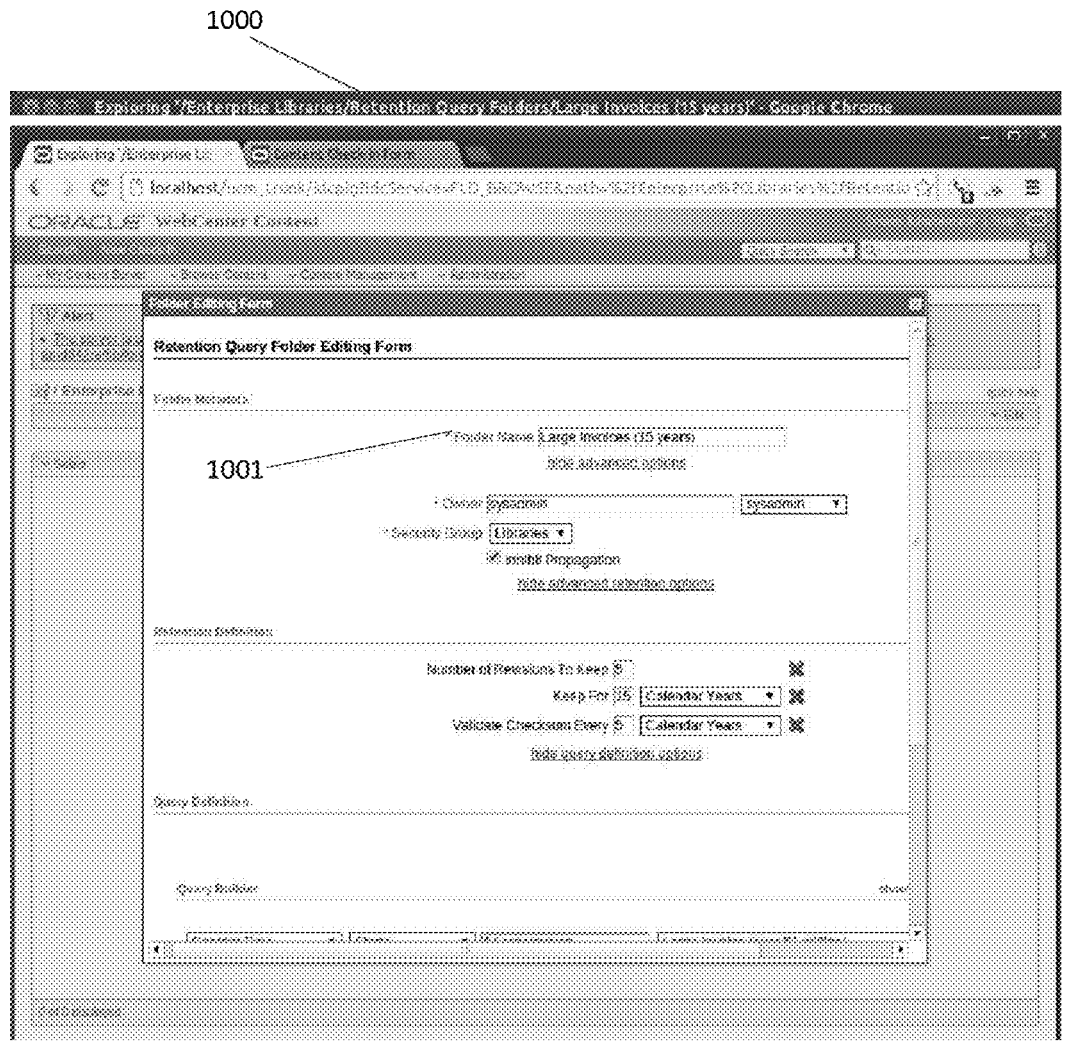
FIG. 10 is a screen shot of an interface for editing retention rules of another retention query folder in accordance with an embodiment of the present invention.

FIG. 10 is a screen shot of an interface 1000 for editing retention rules of another retention query folder 1001 in accordance with an embodiment of the present invention. Similar to editing the retention query folder "Federal Construction Contracts" of FIG. 7, users may also edit other retention query folders such as "Large Invoices" 1001 as shown in FIG. 10.

Figure 11:
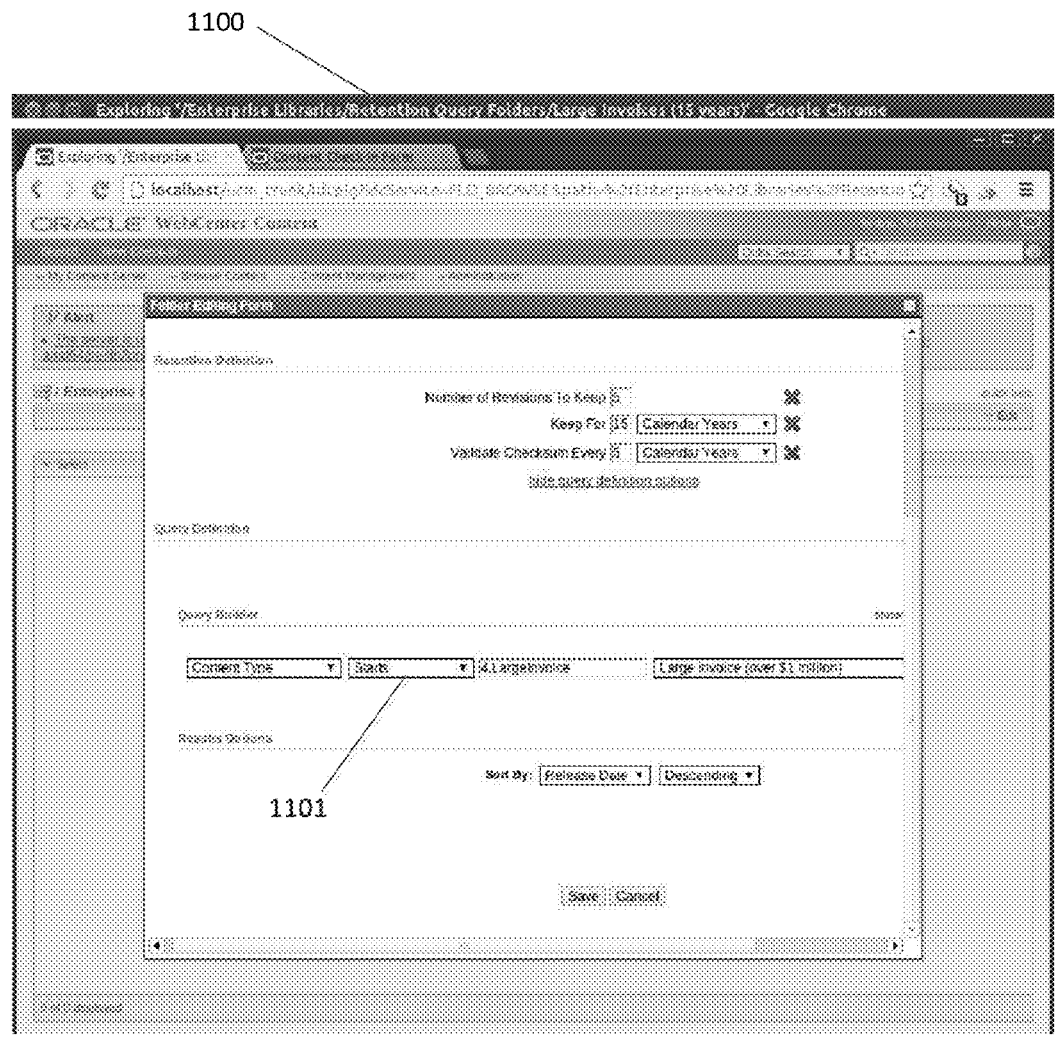
FIG. 11 is a screen shot of an interface for defining another criteria for a retention query folder in accordance with one embodiment.

FIG. 11 is a screen shot of an interface 1100 for defining another criteria 1101 for a retention query folder in accordance with one embodiment. Similar to the retention query folder "Federal Construction Contracts" of FIG. 7, users may also define criteria 1101 for other retention query folders such as retention query folder "Large Invoices" as shown in FIG. 11.

Figure 12:
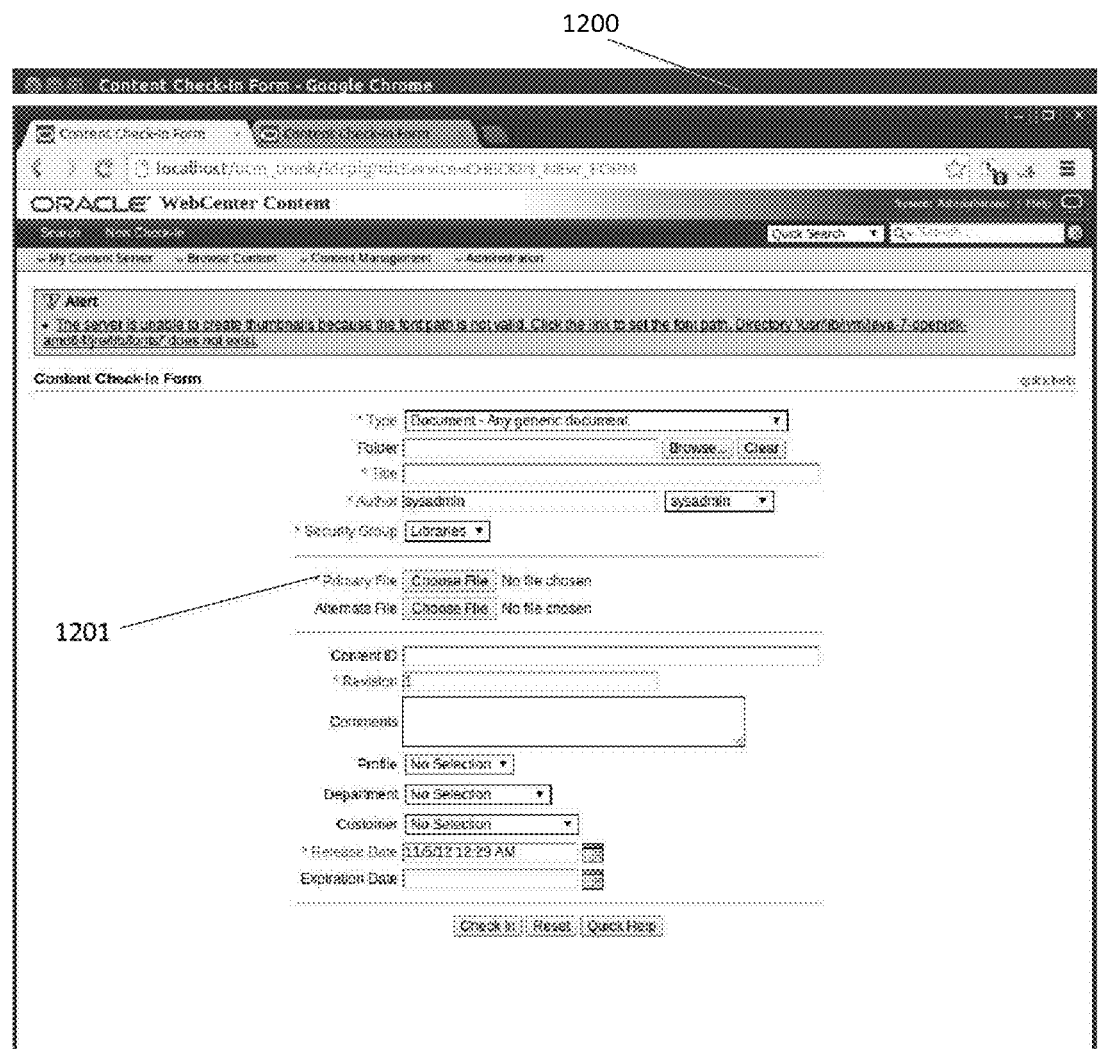
FIG. 12 is a screen shot of an interface for defining a record in accordance with one embodiment.

FIG. 12 is a screen shot of an interface 1200 for defining a record in accordance with one embodiment. Interface 1200 allows a user to select a document to be declared as a record via button 1201. For example, in one embodiment, the user can select a document on a local computer that is to be uploaded to a server and then declared as a record. In one embodiment, a user may define the record by adding metadata to the record, as previously described above. Notably, in contrast to interface 400 of the prior art shown in FIG. 4, interface 1200 does not require a user to manually select a specific retention rule to apply to the selected record. Instead, in contrast to the known approaches, embodiments of the present invention will automatically associate the selected record with a retention query folder, and then apply the specific retention rule (e.g., retention rules 701-703) of the retention query folder to the selected record. In one embodiment, because the association of retention query folders and/or retention rules with records is performed automatically, the user is not prompted to perform any association. The user may be unaware that the association is performed.

As described above, the criteria of the retention query folders (e.g., criteria 801 and 901) may be based on metadata information associated with the records (e.g., metadata that an organization uses to define/categorize the records in order to serve other business needs). For example, in order for a record to be associated with a "marketing contracts" retention query folder, the record may need to satisfy a criteria such as "(department=marketing) and (documentType=contracts)." After such a criteria is defined, the "marketing contracts" retention query folder may be automatically associated with records after the department and documentType of the records are specified by the user. Users may not need to specifically associate the "marketing contracts" retention query folder with the records they create. Retention query folders may also be associated with records based upon geographical locations associated with the records. Because retention query folders may be automatically associated with the records to be retained, future changes to the retention policies (and the criteria defined by the retention policies) do not require costly changes/updates to any retention identifiers associated with the records.

In another embodiment, retention rules of retention query folders may be defined by referencing a pre-defined retention schedule (e.g., a "General Records Schedule," a "Corporate Records Schedule," a "Contracts-GRS-25" schedule, etc.). For example, a retention rule may be defined as: "If (record type=contract) retain according to category 'Contracts-GRS-25'."

In another embodiment, as previously described above, a checksum may be computed on certain records, and the checksum may be validated periodically. In one embodiment, a checksum may be a value assigned to a particular record that acts as a digital signature for the record. In certain embodiments, a checksum is calculated by processing portions of a record using an algorithm designed for calculating checksums. Therefore, the integrity of the content of these records can be reviewed periodically by comparing presently-calculated checksums against previously-calculated checksums for the records. As such, in this embodiment, a review process that is typically done manually in accordance with a retention rule may be automated.

Figure 13A:
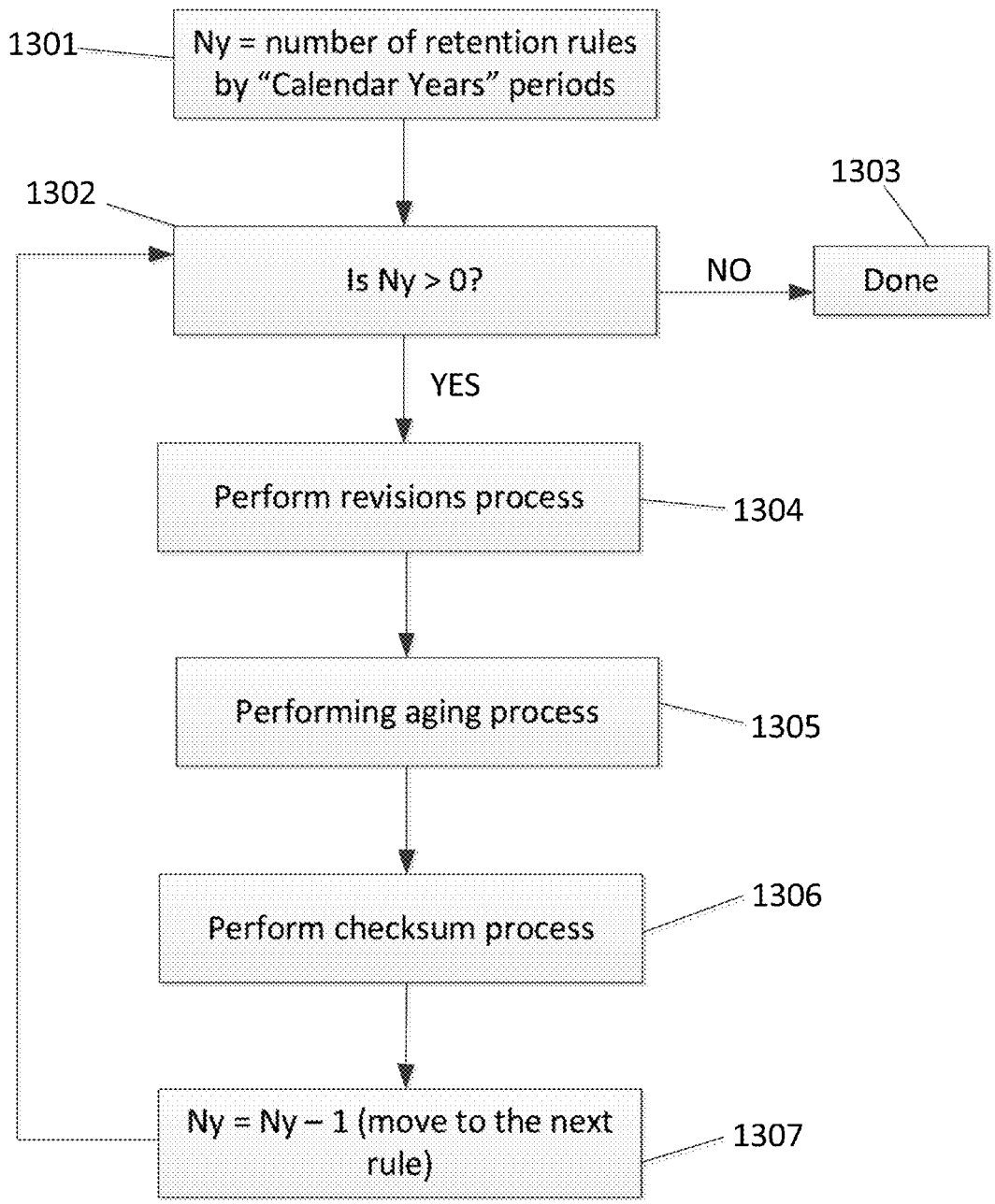
FIG. 13(*a*) is a flow diagram of the functionality of the retention category/rule application module of FIG. 1 in accordance with one embodiment.

FIG. 13(a) is a flow diagram of the functionality of the retention category/rule application module of FIG. 1 in accordance with one embodiment. In one embodiment, the functionality of the flow diagrams of FIG. 13(a)-(d), and FIG. 14 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In one embodiment, at 1301, an iterative process begins. The iterative process is performed based upon a number of retention rules (e.g., number "Ny") to be processed. At 1302, if there are still retention rules to be processed (i.e., Ny>0), then a revisions process is performed at 1304. In one embodiment, the system checks to ensure that a proper number of revisions are being stored. At 1305, an aging process is performed. In one embodiment, the system may retain a specific record for a predetermined retention period. In one embodiment, the system may delete the specific record at the end of the predetermined retention period. If the retention period for the record has been exceeded, then the record is deleted during the aging process. At 1306, a checksum process is performed on the updated records to determine whether the integrity of the records has been compromised, as described in more detail below. At 1307, the number of retention rules to be processed is decremented (i.e., Ny=Ny−1), and the process returns to 1302. After all of the retention rules are processed (i.e., Ny=0), the process finishes at 1303.

In one embodiment, a background process may be executed periodically to perform scheduled actions as defined by a retention rule. For example, a background process may be executed annually or monthly, depending on the retention rule that determines the execution of the background process. For example, for a retention rule that indicates: "Keep 5 years if [(documentType=budget) and (department=marketing)]," the background process may be initiated each year, and the background process would find all records that are more than 5 years old that have (documentType=budget) and (department=marketing) and subsequently delete these records.

In another embodiment, a retention query folder is associated with a checksum review period of a specified amount of time (e.g., 3 months). The system would then have a background process that runs every month and recomputes the checksums of the records in this retention query folder. The background process may check newly computed checksums against the checksums that were computed when the records were first created or placed within the retention query folder. If the checksums do not match, the records with the mis-matched checksums would be listed in an error list that would be sent to a user in an alert message. Therefore, certain embodiments automate the process of verifying the integrity of the records in retention query folders. These embodiments may be applicable to any product in the field of records/content management.

Figure 13B:
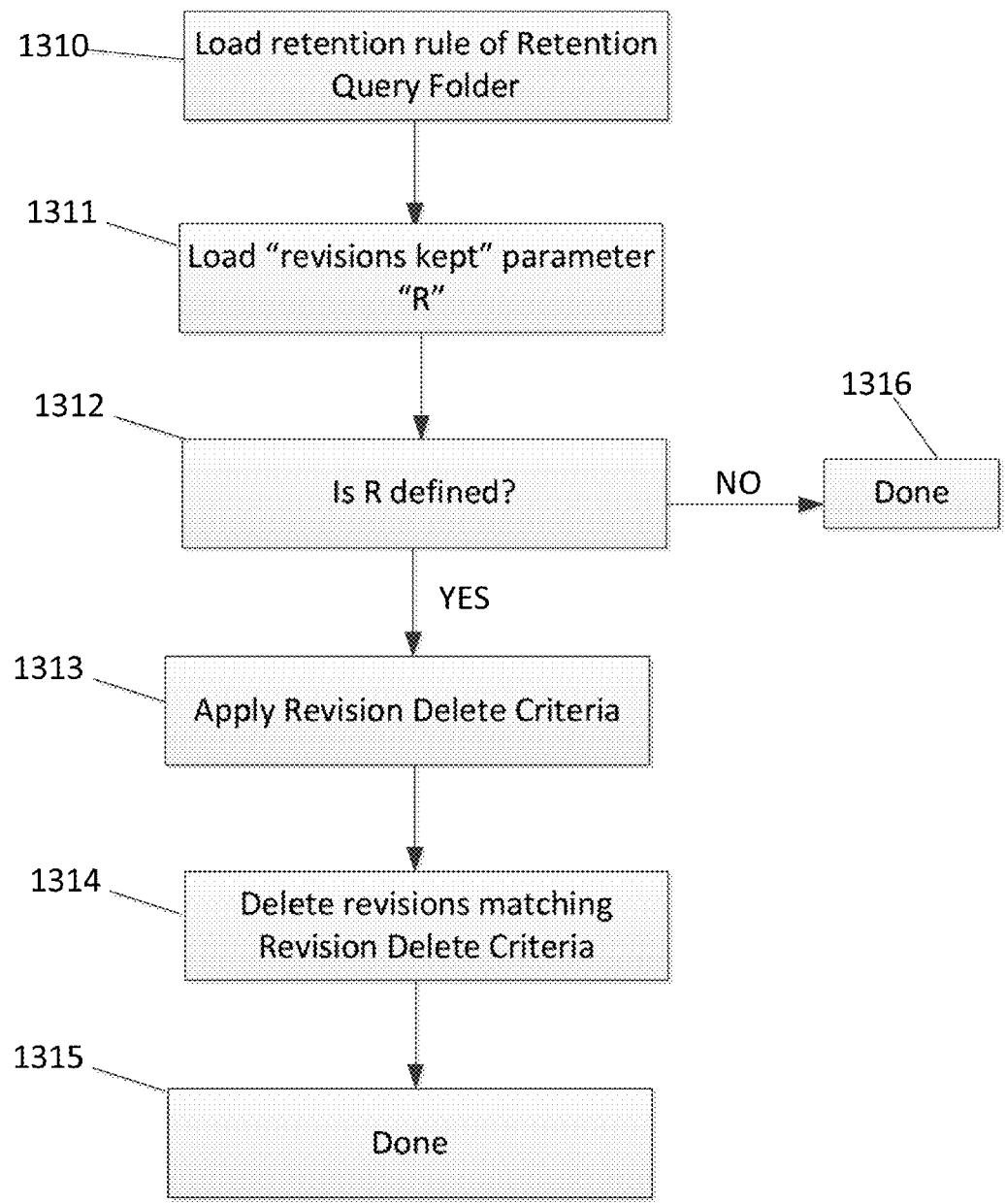

FIG. 13(b) is a flow diagram of performing a revisions process of 1304 of FIG. 13(a) in accordance with one embodiment. The revisions process, at 1310, can load a retention rule of a retention query folder. At 1311, a parameter "R," which can determine a maximum number of revisions to be kept of a record, can be loaded from the loaded retention rule. At 1312, if parameter "R" does not define any maximum number of revisions to be kept of a record, the process finishes at 1316. At 1313, if parameter "R" does define a maximum number of revisions to be kept of a record, a revision-delete criteria can be applied to a specific record. The revision-delete criteria is applied to the specific record if (1) the retention rule of the retention query folder is applicable to the specific record, and (2) the number of stored revisions of the specific record exceeds parameter "R." At 1314, the revisions which match the revision-delete criteria are deleted. At 1315, the process is finished.

Figure 13C:
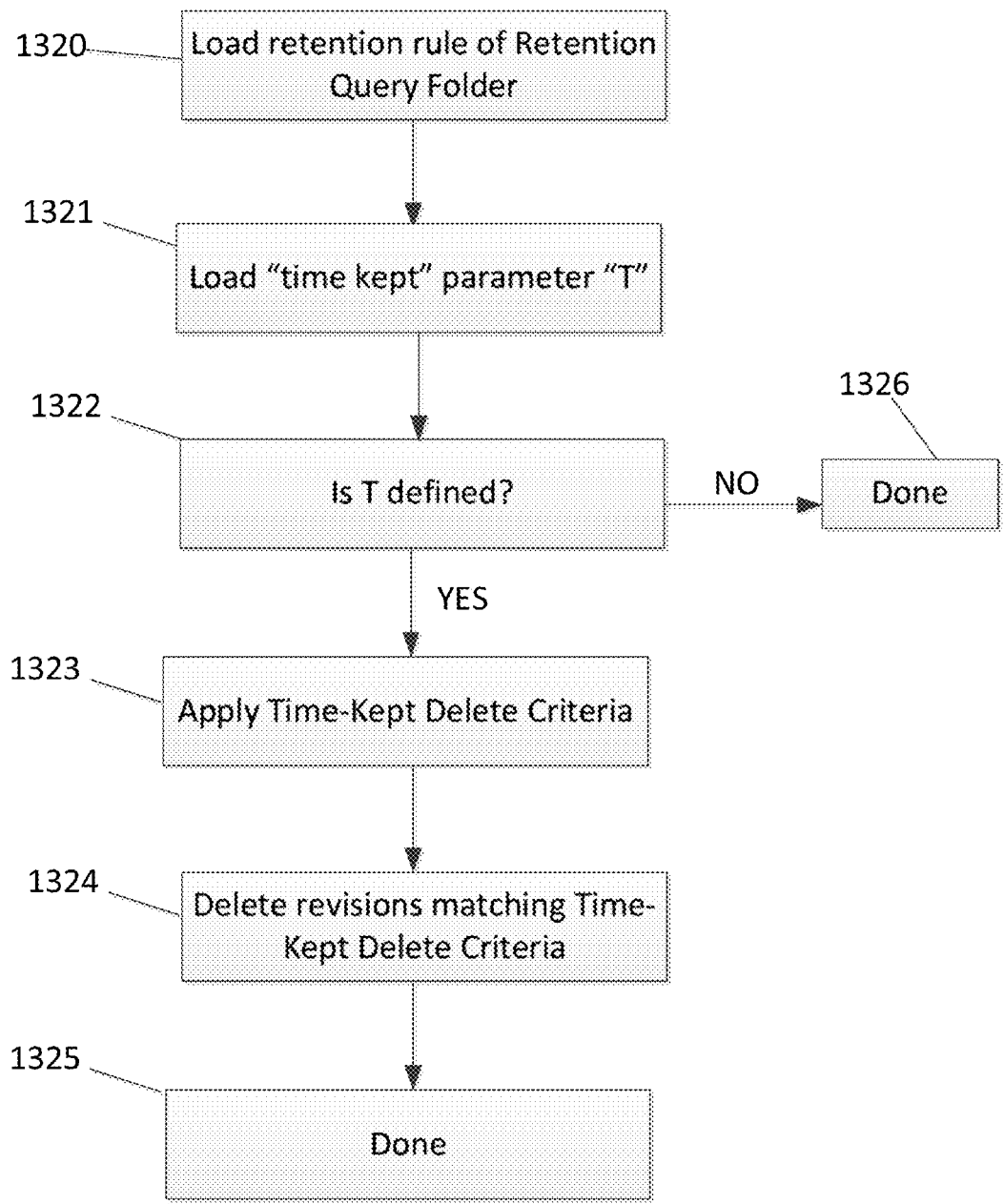

FIG. 13(c) is a flow diagram of performing an aging process of 1305 of FIG. 13(a) in accordance with one embodiment. The aging process, at 1320, can load a retention rule of the retention query folder. At 1321, a parameter "T," which can determine a maximum amount of time to keep a record, can be loaded from the loaded retention rule. At 1322, if parameter "T" does not define a maximum amount of time to keep a record, the process finishes at 1326. At 1323, if parameter "T" does define a maximum amount of time to keep a record, a time-kept delete criteria can be applied to a specific record. The time-kept delete criteria can be applied to the specific record if (1) the retention rule of the retention query folder is applicable to the specific record, and (2) the elapsed time between the current date and the time when the specific record began to be kept has exceeded the maximum time to keep the specific record. At 1324, the revisions which match the time-kept delete criteria are deleted. At 1325, the process is finished.

Figure 13D:
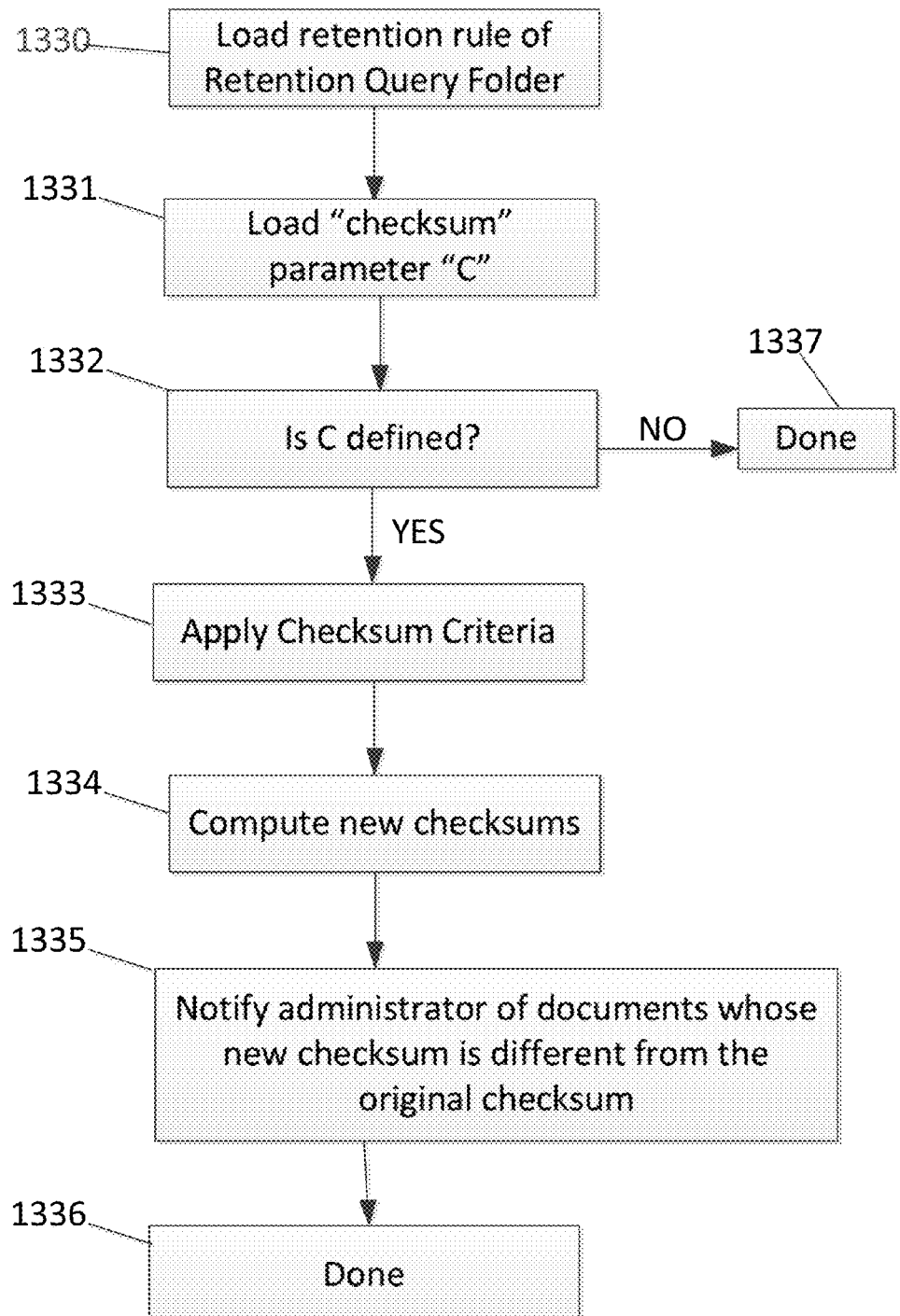

FIG. 13(d) is a flow diagram of performing a checksum process of 1306 of FIG. 13(a) in accordance with one embodiment. The checksum process, at 1330, can load a retention rule of a retention query folder. At 1331, a parameter "C," which corresponds to an amount of time that passes before recomputing a checksum of a record, can be loaded. At 1332, if parameter "C" does not define an amount of time for recomputing a checksum of a record, the process finishes at 1337. At 1333, if parameter "C" does define an amount of time for recomputing a checksum, a checksum criteria can be applied to a specific record. The checksum criteria is applied to the specific record if (1) the retention rule of the retention query folder is applicable to the specific record, and (2) the elapsed time between the current date and the time when the record was last reviewed has exceeded the amount of time that passes before recomputing the checksum (i.e., the amount of time corresponding to parameter "C"). At 1334, a checksum is computed for the specific record. At 1335, if the computed checksum of the specific record is different from the original checksum associated with the specific record at the time the specific record was stored, then the administrator is notified. At 1336, the process is finished.

Figure 14:
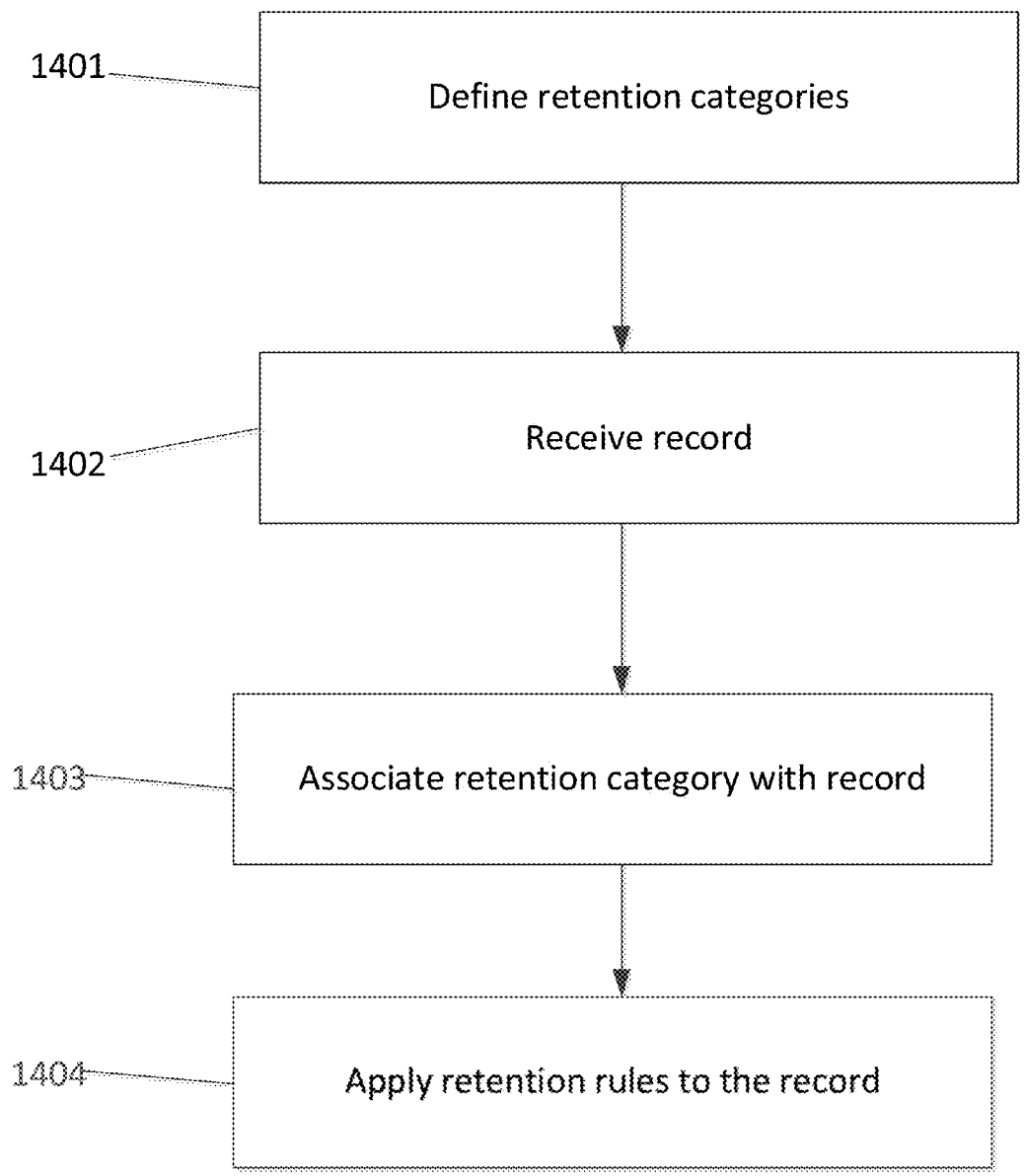
FIG. 14 is a flow diagram of the functionality of the retention category/rule application module of FIG. 1 in accordance with another embodiment.

FIG. 14 is a flow diagram of the functionality of the retention category/rule application module 16 of FIG. 1 in accordance with one embodiment. At 1401, a user defines retention categories that may direct the organizing, keeping, safeguarding, and/or disposing of records. Each retention category of the plurality of retention categories comprises a criteria for membership in the retention category and a retention rule for the retention category. As previously described, in one embodiment, a retention category may be implemented, and referred to, as a retention query folder.

At 1402, a record is received.

At 1403, a retention category of the plurality of retention categories is automatically associated with the received record. The received record meets the criteria for membership of the associated retention category.

At 1404, the retention rule of the associated retention category is automatically applied to the received record.

As described above, certain embodiments are directed to a system for applying retention categories and retention rules to records. The system may avoid costly changes/updates when retention policies are changed. The system may also apply retention categories and retention rules to records more easily because certain embodiments do not require a user to have experience with associating retention categories/rules with records. Certain embodiments may also provide a simpler user experience by removing the mechanics of retention and review from the user experience.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to apply retention rules to electronic records, the applying comprising:
    defining a plurality of retention categories, each of the plurality retention categories being defines by one or more criteria for membership in the retention category, the criteria membership including at least one of a department or a document type, each of the plurality of retention categories including at least one retention rule;
    receiving an electronic record, the record including stored metadata information, the metadata information including at least one of a department related to the record, or a document type of the record;
    determining whether the record satisfies the criteria for membership in a retention category of the plurality of retention categories, including at least one of matching the department of the record to a corresponding department of one of the plurality of retention categories, or matching the document type of the record to a corresponding document type of one of the plurality of retention categories, wherein records that satisfy criteria for membership in the retention category are subject to the at least one retention rule of the category, the retention category comprising a first query of the metadata information, the determining in response to applying the first query;
    automatically associating the retention category with the record when the record matches the criteria for membership in the retention category;
    applying the at least one retention rule of the retention category to the record, the retention rule comprising a retention period; and
    automatically deleting the electronic record when the retention period has been exceeded.

2. The computer readable medium of claim 1, wherein the automatically deleting is executed as a background process at a predetermined time period that is defined by the retention rule.

3. The computer readable medium of claim 1, wherein applying the at least one retention rule verifies an integrity of the record using a checksum that is periodically computed.

4. The computer readable medium of claim 1, wherein the at least one retention rule references a retention schedule.

5. The computer readable medium of claim 1, wherein the metadata information comprises data associated with the record to serve business needs that are unrelated to the retention of the record.

6. A method for automatically applying retention rules to electronic records, the method comprising:
    defining a plurality of retention categories, each of the plurality of retention categories being defined by one or more criteria for membership in the retention category, the criteria for membership including at least one of a department or a document type, each of the plurality of retention categories including at least one retention rule;
    receiving an electronic record, the record including stored metadata information, the metadata information including at least one of a department related to the record, or a document type of the record;
    determining whether the record satisfies the criteria for membership in a retention category of the plurality of retention categories, including at least one of matching the department of the record to a corresponding department of one of the plurality of retention categories, or matching the document type of the record to a corresponding document type of one of the plurality of retention categories, wherein records that satisfy the criteria for membership in the retention category are subject to the at least one retention rule of the retention category, the retention category comprising at first query of the metadata information, the determining in response to applying the first query;
    automatically associating the retention category with the record when the record matches the criteria for membership in the retention category;
    applying the at least one retention rule of the retention category to the record, the retention rule comprising a retention period; and
    automatically deleting the electronic record when the retention period has been exceeded.

7. The method of claim 6, wherein the automatically deleting is executed as a background process at a predetermined time period that is defined by the retention rule.

8. The method of claim 6, wherein applying the at least one retention rule verifies an integrity of the record using a checksum that is periodically computed.

9. The method of claim 6, wherein the at least one retention rule references a retention schedule.

10. The method of claim 6, wherein the metadata information comprises data associated with the record to serve business needs that are unrelated to the retention of the record.

11. A system for automatically applying retention rules to electronic to records, the system comprising:
    a processor;
    a memory coupled to the processor;
    a defining module that defines a plurality of retention categories, each of the plurality of retention categories being defined by one or more criteria for membership in the retention category, the criteria for membership including at least one of a department or a document type, each of the plurality of retention categories including at least one retention rule;
    a receiving module that receives an electronic record, the record including stored metadata information, the metadata information including at least one of a department related to the record, or a document type of the record;
    a determining module that determines whether the record satisfies the criteria for membership in a retention category of the plurality of retention categories, including at least one of matching the department of the record to a corresponding department of one of the plurality of retention categories, or matching the document type of the record to a corresponding document type of one of the plurality of retention categories, wherein records that satisfy the criteria for membership in the retention category are subject to the at least one retention rule of the retention category, the retention category comprising a first query of the metadata information, the determining in response to applying the first query;

an associating module that automatically associates the retention category with the record when the record matched the criteria for membership in the retention category;

an applying module that applies the at least one retention rule of the retention category to the record, the retention rule comprising a retention period and automatically delete the electronic record when the retention period has been exceeded.

12. The system of claim 11, wherein the automatically deleting is executed as a background process at a predetermined time period that is defined by the retention rule.

13. The system of claim 11, wherein applying the at least one retention rule verifies an integrity of the record using a checksum that is periodically computed.

14. The system of claim 11, wherein the at least one retention rule references a retention schedule.

15. The system of claim 11, wherein the metadata information comprises data associated with the record to serve business needs that are unrelated to the retention of the record.

* * * * *

UNITED STATES PATENT AND TRADEMARK OFFICE
CERTIFICATE OF CORRECTION

PATENT NO. : 10,496,628 B2
APPLICATION NO. : 13/771692
DATED : December 3, 2019
INVENTOR(S) : Owuor et al.

It is certified that error appears in the above-identified patent and that said Letters Patent is hereby corrected as shown below:

In the Claims

In Column 9, Line 23, in Claim 1, delete "plurality" and insert -- plurality of --, therefor.

In Column 9, Line 23, in Claim 1, delete "defines" and insert -- defined --, therefor.

In Column 9, Line 25, in Claim 1, delete "criteria" and insert -- criteria for --, therefor.

In Column 9, Line 40, in Claim 1, delete "satisfy" and insert -- satisfy the --, therefor.

In Column 9, Line 42, in Claim 1, delete "category," and insert -- retention category, --, therefor.

In Column 10, Line 24, in Claim 6, delete "at" and insert -- a --, therefor.

In Column 10, Line 47, in Claim 11, delete "for automatically" and insert -- for --, therefor.

In Column 10, Line 48, in Claim 11, delete "electronic to" and insert -- electronic --, therefor.

In Column 11, Line 12, in Claim 11, delete "matched" and insert -- matches --, therefor.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*